United States Patent [19]

Takagi et al.

[11] Patent Number: 5,194,481
[45] Date of Patent: Mar. 16, 1993

[54] FLAME-RETARDANT POLYESTER RESIN COMPOSITIONS

[75] Inventors: Tatsuaki Takagi; Hiroyuki Amano, both of Shizuoka, Japan

[73] Assignee: Polyplastics Co., Ltd., Osaka, Japan

[21] Appl. No.: 796,934

[22] Filed: Nov. 25, 1991

[30] Foreign Application Priority Data

Nov. 30, 1990 [JP] Japan .................................. 2-334469

[51] Int. Cl.$^5$ ................................................. C08K 330
[52] U.S. Cl. .................................... 524/410; 524/411; 524/464; 524/546
[58] Field of Search ................ 524/410, 546, 411, 464

[56] References Cited

U.S. PATENT DOCUMENTS 4,344,878  8/1982  Dolce ................................... 524/409
4,464,501  8/1984  Taubert et al. ...................... 524/410

FOREIGN PATENT DOCUMENTS 0174826   3/1986  European Pat. Off. .
200217   11/1986  European Pat. Off. .
63-175306  7/1988  Japan .

Primary Examiner—Paul R. Michl
Assistant Examiner—Tae H. Yoon
Attorney, Agent, or Firm—Nixon & Vanderhye

[57] ABSTRACT

Flame-retardant thermoplastic polyester resin compositions are formed by melt-blending a polyester base resin, and a flame-retardant package which includes (i) an organohalogen flame retardant, and (ii) a low-sulfate containing antimony oxide (i.e., having a sulfate content of 0.05% by weight or less) as an auxiliary flame retardant. The compositions of this invention may optionally include a drip-resistant effective amount of a polytetrafluoroethylene resin. The low sulfate-containing antimony oxide is preferably antimony trioxide.

7 Claims, No Drawings

FLAME-RETARDANT POLYESTER RESIN COMPOSITIONS

FIELD OF THE INVENTION

The present invention is generally related to the field of moldable flame-retardant polyester resin compositions. In preferred forms, the present invention is embodied in melt-stable flame-retardant polyester resin compositions which exhibit exceptional workability and blendability characteristics during extrusion-molding without impairing the compositions' excellent mechanical and flame-retardant properties.

BACKGROUND AND SUMMARY OF THE INVENTION

Thermoplastic polyester resins, such as polyalkylene terephthalate resins (e.g., polybutylene terephthalate) are well known engineering resins that have been used extensively in various fields owing to their excellent mechanical and electrical properties, as well as their physical and chemical characteristics. Thus, thermoplastic polyester resins have been used to form molded parts and components for automotive, electrical and electronic end-use applications.

In those end-use applications requiring flame-retardant properties, such as parts and/or components for electrical and electronic apparatus, organohalogen primary flame retardants and one or more auxiliary flame retardants have typically been blended with thermoplastic polyesters in order to impart the desired level of flame-retardant properties thereto. Furthermore, improved flame-retardant properties have been imparted to thermoplastic polyester resins by introducing a flame-retardant group (usually a halogen-containing group) into the polyester resin during polymerization, and then augmenting the flame-retardant property enhancement that is achieved by blending an auxiliary flame-retardant with the polyester resin.

The costs of organohalogen flame retardants is relatively expensive as compared to the thermoplastic polyester base resin with which it is blended. As a consequence, those in the art have typically employed relatively inexpensive antimony oxide as an auxiliary flame-retardant in as large amounts as possible in order to reduce the amounts (and hence costs) of the primary organohalogen flame-retardant.

In this connection, antimony trioxide is representative of the class of antimony oxides that may be blended with thermoplastic polyesters as an auxiliary flame-retardant. However, antimony trioxide is typically in the form of a fine powder having a mean particle diameter of 0.1 to several microns. As a result, when directly blended with polyester base resins and/or a primary flame retardant, the antimony trioxide is likely to agglomerate and accumulate upon various parts of the extrusion processing equipment (e.g., the extruder screw, pipe walls, and the like). Thus, periodic equipment down time is needed in order to remove the accumulated antimony trioxide thereby resulting in lost production and increased maintenance costs.

One technique that has been employed in the art in order to avoid the above-noted problem is to use a so-called "two-stage" blending technique when antimony trioxide is added to polyester base resins. According to this technique, the antimony trioxide is pre-blended with powdered (pulverized) polyester base resin and/or a primary flame retardant to form a powdery master batch. This master batch may then be melt-blended with feed pellets of the thermoplastic polyester resin. Apparently, the powdery master batch serves as a carrier of sorts to more evenly disperse the antimony trioxide throughout the resulting thermoplastic polyester base resin and thereby minimize agglomeration. However, the down side of this two-stage blending process is that it is more labor-intensive as compared to direct blending techniques so that production costs are higher. Moreover, even when such a two-stage blending process is followed, a homogenous distribution of the antimony trioxide throughout the thermoplastic polyester base resin may still not result. Thus, molded polyester parts of of less than desired quality results.

What has been needed therefore is a thermoplastic polyester molding resin that has adequate flame-retardant properties, but yet allows meaningful amounts of antimony oxides to be incorporated thereinto as an auxiliary flame-retardant without the attendant problems noted above. It is towards fulfilling such a need that the present invention is directed. Broadly, the present invention is embodied in moldable thermoplastic polyester resins and to molded articles formed of the same which include a thermoplastic polyester base resin, and a flame-retardant effective amount of (i) an organohalogen flame-retardant, and (ii) an auxiliary flame retardant in the form of antimony oxide having a sulfate content of 0.05% by weight or less.

Preferably, the flame-retardant package of the organohalogen flame retardant and the antimony oxide flame retardant are present between 1 to 40 parts by weight and between 1 to 30 parts by weight, respectively, based on 100 parts by weight of the thermoplastic polyester base resin. The compositions of this invention may optionally contain an effective amount of between 0.01 to 5 parts by weight (based on 100 parts by weight of the thermoplastic polyester base resin) of a polytetrafluoroethylene resin to enable the compositions of this invention to pass the burn test (V-O) of Underwriters Laboratories Standard UL-94.

Further advantages and aspects of this invention will become more clear after careful consideration is given to the following detailed description of the preferred exemplary embodiments.

DETAILED DESCRIPTION OF THE PREFERRED EXEMPLARY EMBODIMENTS

The compositions of this invention necessarily include, and are especially characterized by, antimony oxide having a sulfate content of 0.05%, and preferably 0.02%, by weight or less as determined by the technique to be described in greater detail below. The antimony oxides that may successfully be employed in the practice of this invention include antimony trioxide, antimony tetraoxide and antimony pentaoxide that can be obtained by any conventional synthesis process. For example, the antimony trioxide that may be employed in the compositions of this invention may be conventionally prepared by boiling antimony oxychloride (which is a hydrolysis product of antimony chloride together with a sodium carbonate solution), or by firing antimony sulfide or metallic antimony by heating at elevated temperatures.

As noted above, the antimony oxide used in the compositions of the present invention must have a sulfate content of 0.05%, preferably 0.02%, by weight or less as determined by the following sulfate content analysis (SCA) technique:

Sulfate Content Analysis (SCA) of Antimony Oxide (1) A solution containing 90 ml of water and 0.1 ml of hydrochloric acid is added to a beaker containing 5.0 grams of an antimony oxide sample. The beaker contents are boiled for about 5 minutes, cooled and filtered with laboratory filter paper. The remaining filter cake is washed with a small amount of water. Water is further added to a mixture comprising the filtrate and the washings so as to yield a total volume of 100 ml.

(2) 10.0 ml of the resulting liquid is poured into a measuring flask, followed by the addition of 10.0 ml of ethyl alcohol, 2.0 ml of a buffer solution (prepared by dissolving 47.25 grams of monochloroacetic acid and 3.40 grams of potassium hydroxide in water so as to give a total volume of 250 ml) and 0.20 ml of a standard barium solution (prepared by dissolving 0.890 gram of special reagent grade barium chloride in water so as to yield a total volume of 1.0 liter). Water is then added to the obtained mixture so as to obtain an accurate total volume of 25.0 ml.

(3) A part of the sample mixture prepared above is placed in a centrifuge tube and centrifuged at 2500 rpm to 3000 rpm for 20 minutes and examined for flame luminosity of barium with an atomic absorption spectrometer under the following conditions to determine the sulfate content based on a preliminarily prepared calibration curve:

wavelength of measurement: 553.6 nm flame: $N_2O$ - 1.6 $kg/cm^2$ $C_2H_2$ - 0.20 to 0.22 $kg/cm^2$ Calculation Formula:

$$SO_4(\%) = \frac{\text{detected amount of sulfates }(\mu g)}{\text{amount of the sample }(g)} \times \frac{100 \text{ ml}}{10 \text{ ml}} \times 10^{-4}$$

Antimony oxide(s) having a sulfate content of 0.05% or less as determined by the above-described sulfate content analysis will hereinafter be referred to as "low sulfate-containing antimony oxide(s)".

It has been discovered that use of antimony oxides having a sulfate content of greater than 0.05% by weight as determined by the sulfate content analysis described above in flame-retardant thermoplastic polyester compositions is not desirable due to various problems that occur during preparation of the composition. In addition, antimony oxides having sulfate contents of greater than 0.05% by weight will also lower the flame-retardant properties of the resulting composition due to the inhomogeneous (scattered) distribution of the antimony throughout the polyester base resin.

On the contrary, when a flame-retardant polyester resin composition is prepared according to the present invention—i.e., using a low sulfate-containing antimony oxide—it has been discovered that improved processability ensues since clogging and/or accumulation of antimony oxide on the melt-blending equipment is inhibited, thereby resulting in compositions having the antimony oxide homogeneously distributed throughout the polyester base resin. Moreover, it has been discovered that the use of an low sulfate-containing antimony oxide contributes to a reduction in the gas-corrosiveness against electrical component contacts, such as relays or switches, as well as reduced metal corrosiveness and mold-staining. However, the use of low sulfate-containing antimony oxides in the compositions of this invention is especially advantageous since improved flame-retardant properties ensue.

Virtually any particulate form of low sulfate-containing antimony oxide may be employed successfully in the practice of this invention. In this regard, low sulfate-containing antimony oxides having a conventional particle size of between about 0.1 to 30 $\mu$m may be used.

Preferably, the low sulfate-containing antimony oxide will be present in the compositions of this invention in an amount of between 1 to 30 parts by weight, and more preferably between 1 to 15 parts by weight, based on 100 parts by weight of the thermoplastic polyester base resin. When less than 1 part by weight of the low sulfate-containing antimony oxide is present, little if any flame-retardance can be achieved. On the other hand, an excessive amount of sulfate-containing antimony oxide (i.e., in excess of 30 parts by weight) will result in compositions having poor mechanical strength properties which render them practically unusable.

The thermoplastic polyester base resin that is used in the compositions of the present invention is a polyester prepared by the polycondensation of a dicarboxylic acid together with a dihydroxyl compound and/or a hydroxy carboxylic acid, or the polycondenstion of a hydroxy carboxylic acid alone. Furthermore, polyester may be either a homopolyester or a copolyester.

Specific examples of the dicarboxylic acid comonomer that may be used in the preparation of the polyester base resin include conventional dicarboxylic acids such as terephthalic, isophthalic, naphthalenedicarboxylic, diphenyldicarboxylic, diphenyl ether dicarboxylic, diphenylethanedicarboxylic, cyclohexanedicarboxylic, adipic and sebacic acids and alkyl-, alkoxy- and halogen-substituted derivatives thereof. These dicarboxylic acids may be each used in the form of their ester-forming derivatives, for example, ester, thereof with a lower alcohol, such as dimethyl esters. Furthermore, these dicarboxylic acids and their ester-forming derivatives may be used in the form of a mixture of two or more of the same.

Examples of the dihydroxyl compound used to prepare the polyester base resin ethylene glycol, propylene glycol butanediol, neopentyl glycol, hydroquinone, resorcincol, dihydroxyphenyl, napthalenediol, dihydroxydiphenyl ether, cyclohexandiol, 2,2-bis(4-hydroxyphenyl)propane and diethoxylated bisphenol A; polyalkylene glycols and alkyl-, alkoxy or halogen-substituted derivatives thereof. These compounds may also be used alone or as a mixture of two or more the same.

Specific examples of the hydroxy carboxylic acid comonomer include unsubstituted hydroxy carboxylic acids such as hydroxybenzoic, hydroxynaphthoic and diphenylenehydroxycarboxylic acids, and alkyl-, alkoxy- and halogen-substituted derivatives thereof. Further, ester-forming derivatives of these compounds may be used. Again, one or more of such compounds as described above may be employed.

The polyester base resin to be used in the present invention may also be a polyester having a branched or crosslinked structure which is prepared by using a minor amount of a trifunctional monomer in addition to the above components. Preferred trifunctional monomers include trimellitic, trimesic and pyromellitic acids, pentaerythritol and trimethylolpropane.

According to the present invention, any thermoplastic polyester prepared by the polycondensation of the monomer components as described above may be used as the polyester base resin according to the present invention. Although the termoplastic polyester resins thus prepared may be used alone or as a mixture of two or more of such resins, it is preferred to use a polyalkylene terephthalate, still preferably polybutylene terephthalate (PBT) or a PBT copolymer or mixture whereby PBT is the main component.

Virtually any organohalogen compound which is conventionally used as a flame retardant for thermoplastic polyesters may likewise be used in the compositions of the present invention. In this connection, however, aromatic bromine compounds are particularly preferable. Particular examples of aromatic bromine compounds include low-molecular-weight bromine compounds such as diphenyl ether substituted with 5 to 10 bromine atoms; low-molecular-weight organohalogen compounds such as tetrabromobisphenol A; low-molecular weight halogenated polycarbonates (such as polycarbonate oligomer prepared by using brominated bisphenyl A as a raw material); halogenated epoxy compounds (such as diepoxides prepared by the reaction of brominated bisphenol A with epichlorohydrin and monoepoxides prepared by the reaction of brominated phenol with epichlorohydrin); brominated polystyrene; and brominated bisimides (such as lower-alkylenebistetrabromophthalimide). These organohalogen flame retardants may be used either alone or as a mixture of two or more the same.

It is preferred that the amount of the organohalogen flame retardant be as small as possible, because the use of such compounds in large amounts lowers the mechanical properties of the resulting composition. In this regard, the amount of the organohalogen flame retardant in the compositions of this invention is preferably between 1 to 40 parts by weight, or preferably between 5 to 35 parts by weight, and most preferably between 10 to 30 parts by weight per 100 parts by weight of the thermoplastic polyester base resin.

The compositions of the present invention exhibit excellent flame retardance and well-balanced mechanical properties as compared with conventional flame-retardant polyester resin composition. Furthermore, the compositions of the present invention do not exhibit the problems during production (i.e., equipment clogging, metal corrosion, mold staining, and the like) which are typical of conventional antimony oxide-containing polyester resin composition.

The compositions of this invention also may optionally contain a polytetrafluoroethylene resin. The polytetrafluoroethylene (PTFE) resin that may be used can be prepared by any known process technique, such as emulsion or suspension polymerization, and are readily available from a number of commercial sources.

The polytetrafluoroethylene resin may be selected from among those resins having various degrees of polymerization (viscosity) depending upon the desired dispersibility characteristics of the PTFE resin, its processability as well as other physical properties which may be needed. The PTFE resin may be in the form of powders, granules, or fibers with the particle size being selected over a wide range from 0.05 $\mu$m to several millimeters. Although the form and particle size of the PTFE resin may be selected depending upon the processability of the composition and the objective performance and effect thereof, it is preferable from the standpoint of the handleability, productivity and workability during composition preparation that the polytetrafluoroethylene resin be in a granular form having a mean particle diameter of 20 to 800 $\mu$m, and preferably 100 to 700 $\mu$m.

The amount of the PTFE resin in the compositions of this invention is preferably between 0.01 to 5 parts by weight, more preferably between 0.05 to 3 parts by weight per 100 parts by weight of the thermoplastic polyester base resin. When the amount of the PTFE resin is too small, the resulting composition will exhibit poor flame retardance, and particularly poor drip properties as determined by the burning test according to Standard UL-94, even though the flame retardance varies depending upon the other components. On the contrary, when the amount of PTFE resin is too large, the resulting composition will exhibit insufficient physical properties owing to the poor dispersion of the PTFE resin.

The compositions of the present invention may further contain minor amounts of other thermoplastic resins as an auxiliary component, provided that the benefits according to the present invention are not hindered. Examples of such thermoplastic resins include ethylene-acrylate copolymers, polyamides, polyacetals, polystryrenes, styrene-butadiene copolymers, styrene-butadiene-acrylonitrile copolymers, styrene-butadiene-acrylic acid (or its ester) copolymers, styrene-acrylonitrile copolymers, polycarbonates, polyurethanes, polyphenylene oxides, polyphenylene sulfides, polybutadienes, halogenated polyolefins, polyvinyl halides, butyl rubber and multi-layered graft copolymers comprised of polyacrylate as a main component.

The compositions of the present invention may further contain virtually any additive that is conventionally employed in thermoplastic resins for the purpose of imparting desired property characteristics thereto. Examples of such additives include stabilizers such as antioxidants, heat stabilizers and ultraviolet absorbers; antistatic agents; lubricants; mold release agents; coloring agents such as dyes and pigments; lubricating agents; plasticizers; crystallization accelerators; and nucleating agents.

Furthermore, the compositions of the present invention may contain an inorganic or organic, fibrous, powdery or flaky filler.

Examples of fibrous fillers include inorganic fibrous materials such as glass fibers, asbestos fibers, carbon fibers, silica fibers, silica/alumina fibers, zirconia fibers, boron nitride fibers, silicon nitride fibers, boron fibers, potassium titanate fibers, and fibers of metals such as stainless steel, aluminum, titanium, copper and brass. Among them, glass fibers and carbon fibers are particularly representative. Furthermore, high-melting organic fibrous materials such as polyamides and acrylic resins may be used.

Powdery filler materials may include carbon black, silica, quartz powder, glass bead, glass powder, silicates such as calcium silicate, aluminum silicate, kaolin, talc, clay, diatomaceous earth and wollastonite; metal oxides such as iron oxides, titanium oxide, zinc oxide and alumina; metal carbonates such as calcium carbonate and magnesium carbonate; metal sulfates such as calcium sulfate and barium sulfate; silicon carbide, silicon nitride, boron nitride and various metal powders.

Preferred flaky filler materials include mica, glass flake and various metal foils. Particularly, a filler comprised of glass fibers, glass beads or glass flakes as a main component is preferable.

These inorganic fillers may be used alone or as a mixture of two or more of the same. The simultaneous use of a fibrous filler, particularly glass or carbon fibers with a powdery or flaky filler is particularly effective in producing an article which is excellent not only in mechanical strength properties, but also in dimensional accuracy and electrical properties.

If necessary, a sizing agent or surface treatment in association with the above-noted fillers may be used. Examples include functional compounds such as epoxy and isocyanate compounds, which may be applied to the filler prior to the preparation of the composition or may be added during composition preparation.

The compositions of the present invention can be produced by known processes using known apparatus ordinarily used for the production of synthetic resin compositions. For example, the necessary components may be mixed together, kneaded, and extruded with a single-screw or twin-screw extruder to form pellets, which are subsequently molded into molded parts. The preparation of the composition can be conducted simultaneously with the molding step using a molding machine. Alternatively, a part or the entirety of the resin components may be pulverized to form a master batch in order to facilitate their dispersion, mixed with the polyester base resin component and then melt-extruded to form pellets (i.e., so-called two-stage blending).

Further aspects and advantages of this invention will become more clear after careful consideration is given to the following non-limiting Examples.

EXAMPLES

The following test procedures and evaluation techniques were used to obtain the characterizing data according to the Examples:

(1) Extrusion Processability: This test evaluation was conducted during pelletization of the composition using the following techniques:

(i) Blendability: The necessary components were fed into a rocking mixer and mixed therewithin for about 20 minutes. The mixture was discharged and the residual adhesion of the antimony oxide and other components on the wall surface of the mixer was visually evaluated.

(ii) Workability: The wall surface of the above-noted rocking mixer to which residual antimony oxide was adhered was washed with tap water to evaluate subjectively the ease of removal (workability) of the residual antimony oxide from the mixer surface.

(2) Oxygen Index: Determined according to JIS Standard K7201.

(3) Burning Test (UL-94): Fiver test pieces (thickness: 1/32 inch) were examined for flame retardance and dripping characteristics of the resin when burned according to Underwriters' Laboratories, Subject 94 (Standard UL-94).

(4) Metal Staining Properties: 200 grams of resin pellets and a silver plate were placed in a 500 ml reagent bottle and heated in a Geer oven (120° C.) for 400 hours. The silver plate was recovered after cooling and examined visually for its surface appearance characteristics.

(5) Sulfate Content of Antimony Trioxide: Determined according to the sulfate content analysis (SCA) procedure described previously.

Examples 1 to 5 and Comparative Examples 1 to 5

As shown in Table 1, a polybutylene terephthalate (A) having an intrinsic viscosity of 0.8, a halogen-containing flame retardant (B), antimony trioxide (C) containing sulfates in an amount specified in the Table and, optionally, a polytetrafluoroethylene (D) and/or an inorganic filler were mixed together in a rocking mixer at a ration specified in the Table and pelletized with an extruder to form a pelletized composition. A part of this composition was subjected to a metal-staining test described above. A test piece was prepared from the rest of the composition by injection molding and used in determining the oxygen index.

For comparison, the same procedure as that described above was repeated except that antimony trioxide having a sulfate content outside the range specified in the present invention was used. The results are given in Table 1 below.

Examples 6 and 7 and Comparative Examples 6 and 7

As shown in Table 2, a polybutylene terephthalate (A) having an intrinsic viscosity of 0.65, a halogen-containing flame retardant (B), antimony trioxide (C) having a sulfate content specified in the Table, polytetrafluoroethylene (D) and, optionally, an inorganic filler were mixed together in a rocking mixer at a ratio specified in the Table and pelletized with an extruder to form a pelletized composition. A part of this composition was subjected to the metal-staining test described above. A test piece was prepared from the rest of the composition by injection molding and used in determining the oxygen index.

For comparison, the same procedure as that described above was repeated except that antimony trioxide having a sulfate content outside the range specified in the present invention was used. The results are given in Table 2 below.

TABLE 1

| | | Unit | Example 1 | Example 2 | Example 3 | Example 4 | Example 5 |
|---|---|---|---|---|---|---|---|
| Composition | (A) polybutylene terephthalate | pt. by wt. | 100 | 100 | 100 | 100 | 100 |
| | (B) brominated polycarbonate | " | 25.0 | 25.0 | — | — | 20.0 |
| | (B) ethylenebistetrabromophthalimide | " | — | — | 19.0 | 16.0 | — |
| | (C) antimony trioxide[*1] C1 | " | 5.0 | 5.0 | 6.0 | — | — |
| | C2 | " | — | — | — | 12.0 | 12.0 |
| | C'1 | " | — | — | — | — | — |
| | C'2 | " | — | — | — | — | — |
| | (D) polytetrafluoroethylene | " | — | 0.6 | 0.6 | 1.0 | 1.0 |
| | glass fiber | " | — | — | — | 55.0 | 55.0 |
| Quality | test on processability in extrusion — blendability | — | good | good | good | slight adhesion in mixer | slight adhesion in mixer |
| | — workability | — | good | good | good | good | good |
| | oxygen index | | 29.3 | 30.5 | 30.1 | 29.8 | 30.1 |

TABLE 1-continued

|  |  |  | V-2 | V-0 | V-0 | V-0 | V-0 |
|---|---|---|---|---|---|---|---|
| burning test UL-94 | | — | | | | | |
| number of drops | | — | 5 | 0 | 0 | 0 | 0 |
| metal staining properties[*2] | | — | 8 | 8 | 7 | 6 | 8 |

| | | | | Comparative Example | | | | |
|---|---|---|---|---|---|---|---|---|
| | | | Unit | 1 | 2 | 3 | 4 | 5 |
| Composition | (A) polybutylene terephthalate | | pt. by wt. | 100 | 100 | 100 | 100 | 100 |
| | (B) brominated polycarbonate | | " | 25.0 | 25.0 | — | — | 22.0 |
| | (B) ethylenebistetrabromophthalimide | | " | — | — | 19.0 | 16.0 | — |
| | (C) antimony trioxide[*1] | C1 | " | — | — | — | — | — |
| | | C2 | " | — | — | — | — | — |
| | | C'1 | " | 5.0 | 5.0 | 6.0 | — | — |
| | | C'2 | " | — | — | — | 12.0 | 12.0 |
| | (D) polytetrafluoroethylene | | " | — | 0.6 | 0.6 | 1.0 | 1.0 |
| | glass fiber | | " | — | — | — | 55.0 | 55.0 |
| Quality | test on processability in extrusion | blendability | — | significant adhesion in mixer | significant adhesion in mixer | significant adhesion in mixer | significant adhesion in mixer | significant adhesion in mixer |
| | | workability | — | bad | bad | bad | bad | bad |
| | oxygen index | | — | 25.7 | 26.8 | 27.3 | 25.7 | 26.3 |
| | burning test UL-94 | | — | V-2 | V-2 | V-2 | V-0 | V-0 |
| | number of drops | | — | 5 | 2 | 3 | 0 | 0 |
| | metal staining properties[*2] | | — | 3 | 3 | 1 | 2 | 3 |

[*1] sulfate content in antimony trioxide C1 = 0.001 [% by weight]
C2 = 0.009 [% by weight]
C'1 = 0.50 [% by weight]
C'2 = 0.20 [% by weight]
[*2] ranking used in the evaluation with the naked eye
1      10
bad ⟵5⟶ good (scarcely changed)

TABLE 2

| | | | | Example | | Comparative Example | |
|---|---|---|---|---|---|---|---|
| | | | Unit | 6 | 7 | 6 | 7 |
| Composition | (A) polybutylene terephthalate | | pt. by wt. | 100 | 100 | 100 | 100 |
| | (B) brominated epoxy-modified resin | | " | 25.0 | 20.0 | 25.0 | 20.0 |
| | (C) antimony trioxide[*1] | C1 | " | 5.0 | — | — | — |
| | | C2 | " | — | 12.0 | — | — |
| | | C'1 | " | — | — | 5.0 | — |
| | | C'2 | " | — | — | — | 12.0 |
| | (D) polytetrafluoroethylene | | " | 0.6 | 1.0 | 0.6 | 1.0 |
| | glass fiber | | " | — | 55 | — | 55 |
| Quality | test on processability in extrusion | blendability | — | good | slight adhesion in mixer | significant adhesion in mixer | significant adhesion in mixer |
| | | workability | — | good | good | bad | bad |
| | oxygen index | | — | 30.9 | 30.2 | 27.8 | 26.4 |
| | burning test UL-94 | | — | V-0 | V-0 | V-2 | V-0 |
| | number of drops | | — | 0 | 0 | 2 | 0 |
| | metal staining properties[*2] | | — | 9 | 9 | 4 | 4 |

[*1] sulfate content in antimony trioxide C1 = 0.001 [% by weight]
C2 = 0.009 [% by weight]
C'1 = 0.50 [% by weight]
C'2 = 0.20 [% by weight]
[*2] ranking used in the evaluation with the naked eye
1      10
bad ⟵5⟶ good (scarcely changed)

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A flame-retardant polyester molding composition comprising a thermoplastic polyester base resin, and a flame-retardant effective amount of (i) an organohalogen flame retardant, and (ii) between 1 to 30 parts by weight, per 100 parts by weight of the polyester base resin, of a low sulfate-containing antimony trioxide as an auxiliary flame retardant, wherein the sulfate content of the antimony trioxide is 0.05% or less.

2. A flame-retardant polyester molding composition as in claim 1, wherein the organohalogen flame retardant is present in an amount of between 1 to 40 parts by weight per 100 parts by weight of the polyester base resin.

3. A flame-retardant polyester molding composition as in claim 1, wherein the polyester base resin includes polybutylene terephthalate.

4. A flame-retardant polyester molding composition as in claim 3, wherein the polybutylene terephthalate is in the form of a copolyester comprised predominantly of repeating butylene terephthalate units.

5. A flame-retardant polyester molding composition as in claim 1, which further contains a drip-resistant effective amount of a polytetrafluoroethylene resin.

6. A flame-retardant polyester molding composition as in claim 5, wherein said polytetrafluoroethylene resin is present in an amount of between 0.01 to 5 parts by weight per 100 parts by weight of the polyester base resin.

7. A molded article which consists essentially of the flame-retardant polyester molding composition according to any one of claims 1, 2, 3, 4, 5 or 6.

* * * * *